US012238477B2

(12) United States Patent
Solvang et al.

(10) Patent No.: US 12,238,477 B2
(45) Date of Patent: Feb. 25, 2025

(54) WIRELESS MICROPHONE SYSTEM

(71) Applicant: Nomono AS, Trondheim (NO)

(72) Inventors: Audun Solvang, Trondheim (NO); Viktor Rydal, Trondheim (NO)

(73) Assignee: Nomono AS, Trondheim (NO)

( * ) Notice: Subject to any disclaimer, the term of this patent is extended or adjusted under 35 U.S.C. 154(b) by 129 days.

(21) Appl. No.: 17/801,185

(22) PCT Filed: Mar. 12, 2021

(86) PCT No.: PCT/NO2021/050065
§ 371 (c)(1),
(2) Date: Aug. 19, 2022

(87) PCT Pub. No.: WO2021/182974
PCT Pub. Date: Sep. 16, 2021

(65) Prior Publication Data
US 2023/0100204 A1 Mar. 30, 2023

(30) Foreign Application Priority Data
Mar. 12, 2020 (GB) ...................................... 2003606

(51) Int. Cl.
*H04R 1/40* (2006.01)
*H04R 3/00* (2006.01)

(52) U.S. Cl.
CPC ............ *H04R 1/406* (2013.01); *H04R 3/005* (2013.01); *H04R 2201/403* (2013.01); *H04R 2420/07* (2013.01)

(58) Field of Classification Search
CPC .. H04R 1/406; H04R 3/005; H04R 2201/403; H04R 2420/07
(Continued)

(56) References Cited

U.S. PATENT DOCUMENTS 9,800,985 B1 * 10/2017 Wojtowycz .............. H04R 1/08
2002/0001190 A1 1/2002 Everett
(Continued)

FOREIGN PATENT DOCUMENTS

DE 10 2018 100873 A1 7/2019
WO 2019141447 A1 7/2019

OTHER PUBLICATIONS

International Search Report issued in corresponding International Application No. PCT/NO2021/050065 dated Jun. 16, 2021.
(Continued)

*Primary Examiner* — William A Jerez Lora
(74) *Attorney, Agent, or Firm* — Shook, Hardy & Bacon L.L.P.

(57) ABSTRACT

A wireless microphone system with a first wireless microphone comprising a first microphone element arranged to generate a first audio signal, wherein the first microphone is arranged to generate a first output signal that comprises the first audio signal and information identifying the first wireless microphone; a second wireless microphone with a second microphone element arranged to generate a second audio signal, wherein the second microphone is arranged to generate a second output signal that comprises the second audio signal and information identifying the second wireless microphone; and a monitoring device with a display, wherein the monitoring device is arranged to receive the first and second output signals and to use the display to generate a visualisation of at least one aspect of the first and second audio signals, and to associate each visualisation with a representation of the information identifying the corresponding first or second wireless microphone.

17 Claims, 5 Drawing Sheets

(58) Field of Classification Search
USPC .............................................. 381/91, 92, 388
See application file for complete search history.

(56) References Cited

U.S. PATENT DOCUMENTS

| | | | | |
|---|---|---|---|---|
| 2010/0081466 | A1* | 4/2010 | Mao | G10H 1/361<br>455/500 |
| 2011/0028218 | A1 | 2/2011 | Gomes et al. | |
| 2011/0194704 | A1* | 8/2011 | Hetherington | H04R 5/027<br>381/26 |
| 2013/0226593 | A1* | 8/2013 | Magnusson | H04N 9/806<br>704/276 |
| 2015/0189457 | A1 | 7/2015 | Donaldson et al. | |
| 2020/0068282 | A1 | 2/2020 | Thien et al. | |
| 2020/0075041 | A1* | 3/2020 | Magnusson | G10L 25/75 |

OTHER PUBLICATIONS

Great Britain Search Report issued in corresponding Great Britain Application No. 2003606.7 dated Sep. 2, 2020.

* cited by examiner

WIRELESS MICROPHONE SYSTEM

CROSS-REFERENCE TO RELATED APPLICATIONS

This application is a 35 U.S.C. § 371 National Phase of PCT Application No. PCT/NO2021/050065, filed Mar. 12, 2021, which claims priority to Great Britain Application No. 2003606.7, filed Mar. 12, 2020, the disclosures of each of which are incorporated herein by reference in their entirety.

TECHNICAL FIELD

The present invention relates to wireless microphone systems and methods for use in such systems.

BACKGROUND

It is often convenient to use wireless microphones to capture audio from sound sources. For example, in scenarios where a sound scene includes several sound sources, it may be useful to associate one microphone with each source to improve the isolation and quality of the audio from each sound source. Using wireless microphones in such a scenario can avoid the complex and unwieldly set up associated with wired microphones (e.g. that require a wired connection to a central unit). Wireless microphones can also be useful to capture audio from one or more moving sound sources, as the microphone can move with the sound source (e.g. by virtue of being attached to the sound source) without fear of tangling cables or exceeding the length of a connecting wire. In productions including video capture, it may also be desirable to avoid unsightly cables running from wired microphones.

Using wireless microphones will also enable greater flexibility during post-processing or editing of a finished recording of an audio scene by enabling individual editing or modification of the audio signals received from the respective microphones, including adjustment of volume, change of the frequency spectrum (equalization), and application of effects such as reverberation, echo, etc. If the audio scene is captured in a manner that enables creation of spatially encoded sound, individual sound sources may be manipulated even more by changing the spatial appearance of the individual sound sources in the audio scene.

When capturing audio from several sound sources, it is useful to be able to quickly and easily associate an audio signal with the sound source responsible for that audio signal, i.e., the origin of the audio signal. For example, an audio technician may notice that the amplitude of a particular audio signal is too low (e.g., by listening to the audio signal or observing a visual representation of the audio signal at a monitoring station such as a mixing desk), and wish to adjust the position and/or orientation of the microphone that is generating that signal (e.g. to move it closer to the sound source). However, to do so the technician needs to be aware of which microphone is generating the problematic audio signal. With wired microphones the technician may simply follow the wire to a microphone to identify it, but when wireless microphones are used there may be no such physical wired connection to follow. Some wireless systems allow a technician to name a transmitter, a receiver and a recorder input manually, but this is time consuming and adds complexity to the recording process.

Furthermore, the Applicant has recognised that during post-processing (e.g., after a recording session) a user may not know which sound source audio signal(s) came from and thus must rely on an audio technician making diligent manual notes during the audio capture itself. With respect to spatially encoded sound the audio technician may have to rely on a combination of such manual notes in combination with estimates of position based on listening to the captured audio scene. The Applicant has recognised that an improved approach would be desirable.

SUMMARY OF THE DISCLOSURE

When viewed from a first aspect, the invention provides a wireless microphone system comprising:

- a first wireless microphone comprising a first microphone element arranged to generate a first audio signal, wherein the first microphone is arranged to generate a first output signal that comprises the first audio signal and information identifying the first wireless microphone;
- a second wireless microphone comprising a second microphone element arranged to generate a second audio signal, wherein the second microphone is arranged to generate a second output signal that comprises second audio signal and information identifying the second wireless microphone; and
- a monitoring device with a display, wherein the monitoring device is arranged to receive the first and second output signals and to use the display to generate a visualisation of at least one aspect of the first and second audio signals, and to associate each visualisation with a representation of the information identifying the corresponding first or second wireless microphone.

Thus, it will be seen by those skilled in the art that advantageously the present invention facilitates the association of the first and second audio signals with the corresponding first and second wireless microphones. This may be useful both during audio capture (e.g., for live monitoring and/or troubleshooting) and after audio capture (e.g., for editing or post-processing) and may alleviate at least some of the disadvantages set out above by fixing the association at a technical level rather than relying on users to determine it.

It will be understood by those with skill in the art that a system with a first and a second wireless microphone can be generalized to systems with more than two microphones, such that any system with any plurality of microphones are embodiments of a system with two microphones (i.e., two microphones and additional microphones).

In some embodiments, the first wireless microphone has a first visual or audible feature representative of the information identifying the first wireless microphone and the second wireless microphone has a second visual or audible feature representative of the information identifying the second wireless microphone. Thus, it will be easy during set up and during audio capture to identify individual microphones and associate them with signals, sound production controls and visual representations of the audio signals. The first visual or audible feature and the second visual or audible feature may, for example, be chosen from the group consisting of: a first and a second colour, a first and a second symbol, a first and a second alphanumeric string of characters, and a first and a second playable sound file.

The first and second visual, or audible, features thus provide a simple mechanism by which a wireless microphone may be linked intrinsically at a technical level to the audio signal it produces. In some embodiments the first and/or second visual feature comprises a permanent visual feature (i.e., one that cannot be changed). For example, the first and/or second wireless microphone(s) may comprise a microphone housing and the first and/or second visual feature may comprise a permanently coloured portion of the microphone housing. In such embodiments the information identifying the first and/or second colour may be hard-coded (e.g., during manufacture) into the first and/or second wireless microphone(s).

In other embodiments of the wireless microphone system, the first and second visual or audible feature are programmable features chosen from the group consisting of: an LED that can be controlled to emit light with different colours, a display that can be programmed to display one or more different symbols or alphanumeric characters, and a memory that can store one or more selectable or replaceable sound files. This allows the system to configure itself by assigning identification features dynamically, or a user may select and program the system according to need or preference.

In some embodiments of the invention the visualisation of at least one aspect of the first and second output signals generated and displayed at the monitoring device, is a visualisation of a combined signal comprising the first and second audio signals and the system is further arranged to determine one of the first and second audio signals to be a primary contributor to the combined signal. The representation of the information identifying the corresponding first or second wireless microphone may then be a representation of the information identifying the wireless microphone (e.g., by symbol, colour, or name) that is the origin of the audio signal determined to currently be the primary contributor to the combined signal. The definition of what it means that a signal is a primary contributor will be explained in further detail hereinbelow. A combined signal may be an addition or superposition of the two signals, but may also be a signal that switches back and forth between the two signals, i.e., a signal that at any point in time consists of either the first audio signal or the second audio signal. A combined signal may also be a signal derived from the two signals and possibly additional signals, for example a spatially encoded sound-field signal.

Regardless of whether the visual representation of one or more of the first and second audio signals or a combined signal, the at least one aspect may be chosen from the group consisting of: a signal level, a waveform, a spectrum, and a position of the corresponding microphone.

Additionally or alternatively, the wireless microphone system may comprise a storage device (i.e. a recording device) arranged to receive and store the first and second output signals. The first and second audio signals and the information identifying the corresponding wireless microphone, e.g., colour information, can thus be retrieved and used at a later time (e.g. by an editing device for post processing long after a recording is finished). In some embodiments the storage device may be arranged to store a signal derived from the first output signal and the second output signal, for example a spatially encoded signal wherein the first and second audio signals are components. The storage device may, in various embodiments, be located in a base station, a monitoring device, an editing device, or in a remote computer.

It will be realized that when a microphone system according to the present invention is arranged for monitoring during production (i.e., during audio capture) the visualisation of at least one aspect of the audio signals will most likely be a current value or current values for that aspect. Examples may include representations of volume, power, frequency spectrum, or even the current position of the microphones. In embodiments where the system is arranged or adapted for post-processing or editing of the captured audio signals, that have been stored in the storage device, the visualisation of at least one aspect of the first and second output signals is a visualisation of a combined signal comprising the first and second audio signals during a period of time that is covered by the signals stored in the storage device. The system may then be further arranged to determine one of the first and second audio signals to be a primary contributor to the combined signal, to store information identifying the audio signal determined to be the primary contributor together with the first output signal and the second output signal or the signal derived from the first output signal and the second output signal. The representation of the information identifying the corresponding first or second wireless microphone can be a representation of the information identifying the wireless microphone that is the origin of the audio signal determined to be the primary contributor to the combined signal during respective time periods.

In a set of embodiments the wireless microphone system is arranged to determine the position(s) of the first and/or second wireless microphone(s) during audio capture. The position(s) may be determined using audio analysis techniques. For example, the wireless microphone system may comprise a base station comprising a microphone array and the respective first and second positions of the first and second microphones (relative to the base station) may be determined by comparing the first and second audio signals to the output from the microphone array (e.g. to identify time delays between sounds captured by the first and second microphones and the microphone array of the base station and to use these delays to calculate the distance between the base station and the first and second wireless microphones). Additionally or alternatively, the first and/or second position (s) of the first and/or second wireless microphones may be determined by analysing radio signals sent to or from the first and/or second wireless microphone(s) (e.g. wireless communication signals sent between the wireless microphone(s) and a base station).

Thus, embodiments of the wireless microphone system may further comprise a base station with a microphone array arranged to generate a plurality of local audio signals from which a spatially encoded sound-field signal may be produced, and wherein the system is further arranged to determine the position of the first and the second wireless microphone relative to the base station by comparing the first and second audio signals to the output from the microphone array. The determined position of the first and the second wireless microphone may be stored together with the first output signal and the second output signal (i.e., together with the first and the second audio signal along with the identifying information), or with a signal derived from the first output signal and the second output signal. A derived signal may, for example, be a spatially encoded sound-field signal generated at least partly from the first and second audio signal.

The wireless microphone system may comprise an editing device arranged to receive the first and/or second output signal(s) (e.g. after audio capture is complete) and adapted for performing one or more audio processing techniques to the first and/or second audio signal(s). For example, the editing device may be arranged to produce an immersive (i.e., spatially encoded) soundtrack from the first and second audio signals based on user input.

Thus, the editing device may be arranged to utilize the stored identification and the stored position of the first and second wireless microphone during post-processing or editing of the first audio signal, the second audio signal and the plurality of local audio signals from the microphone array, or signals derived therefrom, for example by generating or editing a spatially encoded sound-field signal.

In another aspect of the invention a method is provided for performing the following steps in a wireless microphone system:

- capturing a first audio signal using a first wireless microphone, and generating a first output signal that comprises the first audio signal and information identifying the first wireless microphone;
- capturing a second audio signal using a first wireless microphone, and generating a first output signal that comprises the first audio signal and information identifying the second wireless microphone;
- receiving the first and second output signals at a monitoring device and generating and displaying a visualization of at least one aspect of the first and second audio signals; and
- associating each visualisation with a representation of the information identifying the corresponding first or second wireless microphone.

The method may further comprise providing the first wireless microphone with a visual or audible feature representative of the information identifying the first wireless microphone and the second wireless microphone with a visual or audible feature representative of the information identifying the first wireless microphone.

In some embodiments of the method the first visual or audible feature and the second visual or audible feature are chosen from the group consisting of: a first and a second colour, a first and a second symbol, a first and a second alphanumeric string of characters, and a first and a second playable sound file.

In some embodiments the method further comprises generating a combined signal from the first and the second audio signals; determining one of the first and the second audio signal to be a primary contributor to the combined signal; wherein the visualization of at least one aspect of the first and second audio signals is a visualisation of the combined signal; and wherein the visualisation of the combined signal is associated with a representation of the information identifying the wireless microphone that is the origin of the audio signal determined to currently be the primary contributor to the combined signal.

The first output signal and the second output signal, or a signal derived from the first output signal and the second output signal, may be stored in a storage device.

In some embodiments the method further comprises capturing a plurality of audio signals using a microphone array; using the first audio signal, the second audio signal, and the plurality of audio signals to determine the position of the first and the second wireless microphone relative to the position of the microphone array; and storing the first output signal, the second output signal, the plurality of audio signals, and the determined positions to a storage device.

At least one of the first audio signal, the second audio signal, the plurality of local audio signals, and signals derived therefrom may, in some embodiments, be edited based on at least one of information identifying wireless microphones, determined positions of identified wireless microphones, and determined primary contributors to a combined signal.

According to yet another aspect of the invention, a cloud-based service is provided, comprising a first communication interface arranged to receive a first input signal comprising a first audio signal and information identifying a first microphone and a second input signal comprising a second audio signal and information identifying a second microphone; a monitoring module arranged to receive the first and second output signals from the first communication interface and to generate a visualisation of at least one aspect of at least one of the first and second audio signals, wherein the visualisation includes a representation of the information identifying the corresponding first or second microphone; and a second communication interface arranged to transmit the generated visualisation in a format that can be displayed on a remote device. The cloud-based service thus represents an implementation of the monitoring device and is configured to receive the output signals as input signals and transmit visualisations as graphics information that can be displayed on a computer, a tablet, or a cell phone. Additional functionality of the monitoring, editing and storage devices may, of course, also be implemented in the cloud-based service.

BRIEF DESCRIPTION OF THE DRAWINGS

One or more non-limiting embodiments will now be described, by way of example only, with reference to the accompanying figures in which.

DETAILED DESCRIPTION

Figure 1:
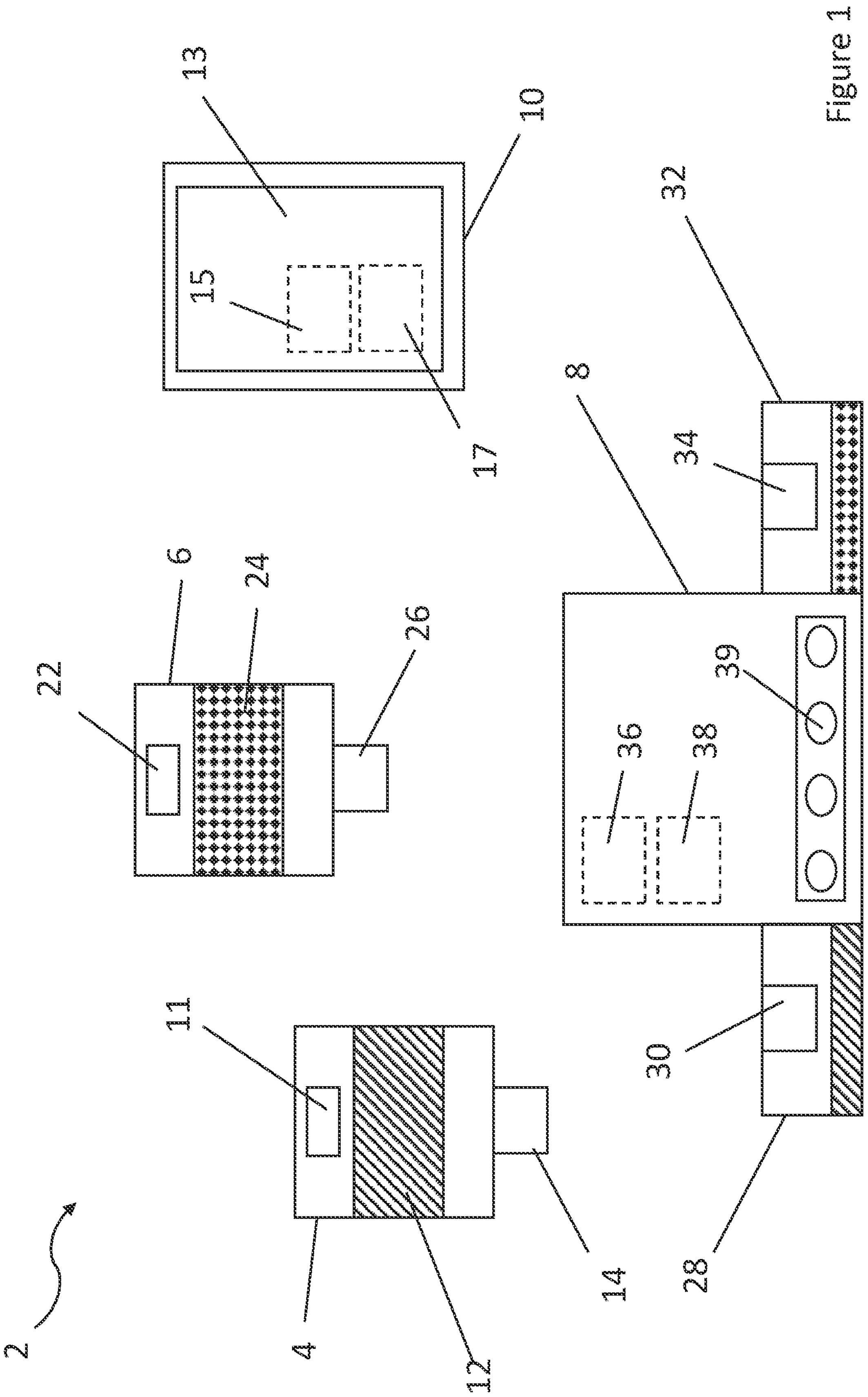
FIG. 1 is a schematic view of a wireless microphone system according to an example of the present invention.

In the following description of various embodiments, reference will be made to the drawings, in which like reference numerals denote the same or corresponding elements. The drawings are not necessarily to scale. Instead, certain features may be shown exaggerated in scale or in a somewhat simplified or schematic manner. Certain conventional elements may have been left out in the interest of exemplifying the principles of the invention rather than cluttering the drawings with details that do not contribute to the understanding of these principles.

It should be noted that, unless otherwise stated, different features or elements may be combined with each other whether or not they have been described together as part of the same embodiment below. The combination of features or elements in the exemplary embodiments are done in order to facilitate understanding of the invention rather than limit its scope to a limited set of embodiments, and to the extent that alternative elements with substantially the same functionality are shown in respective embodiments, they are intended to be interchangeable, but for the sake of brevity, no attempt has been made to disclose a complete description of all possible permutations of features. Similarly, certain features or components may be described as part of a particular device in the system but could in other embodiments be part of a different device. An attempt will be made to mention such alternative configurations where appropriate, but this will not be exhaustive.

Furthermore, those with skill in the art will understand that the invention may be practiced without many of the details included in this detailed description. Conversely, some well-known structures or functions may not be shown or described in detail, in order to avoid unnecessarily obscuring the relevant description of the various implementations. The terminology used in the description presented below is intended to be interpreted in its broadest reasonable manner, even though it is being used in conjunction with a detailed description of certain specific implementations of the invention.

It should be noted that the phrase information identifying as used herein means information that is unique to the device it refers to, such that for example a visual feature, a number, or a name identifies a wireless microphone associated with that visual feature, number, or name. It does not mean performing an act in order to determine an identity. The word identify is sometimes used to refer to the act of determining an identity of a device or signal, but the formal definition of the invention in the claims uses the word determining for any such act. Similarly, when a signal is derived from another signal, this is intended to cover any signal that carries information based on information extracted from the other signal. This includes encryption, decryption, compression, decompression, (lossless or lossy), and production of filtered versions of the other signal, versions subjected to sound effects, combined with other signals, used in the production of spatially encoded sound-field signals, and so on. For the purposes of this disclosure a signal is considered to be the same signal even if it has been subject to distortion, noise, lossy compression, or otherwise has been changed in a way that is not intentional or substantial. For example, an audio signal as produced by a microphone element is considered to be the same audio signal as an audio signal extracted from an output signal that has been transmitted, received and possibly decoded.

A wireless microphone system 2 according to an embodiment of the invention is shown schematically in FIG. 1. The wireless microphone system 2 comprises a first wireless microphone 4, a second wireless microphone 6, a base station 8 and a portable monitoring and editing device 10. Not all embodiments of the invention include all these devices, and in some embodiments the functionality described below may be distributed differently among the devices.

A wireless microphone is capable of transmitting the audio signal it captures (or a version of the audio signal such as a compressed version) to another device without the need for a wired electrical connection. This may be done using a radio frequency (RF) link (e.g. according to the Bluetooth™ or Wi-Fi™ communication standards). The first and second wireless microphones may be battery powered.

It is also consistent with the principles of the invention to use long range wireless such as WiMAX, or mobile or cellular communication standards such as LTE, 4G, and 5G to establish communication between the microphones and the other components of the system. This may enable capture of audio generated at different locations and makes it possible to implement many of the components of the system, such as the monitoring device, the storage device, and the editing device as cloud services. Similar communication capabilities may be utilized in the communication between other components in the system, such that, for example, the base station is a local device which communicates with a cloud-based monitoring and editing device.

In some embodiments, the first wireless microphone comprises a radio frequency wireless transmission module. The wireless transmission module may be arranged to transmit the first output signal (e.g. to a monitoring device). Similarly, the second wireless microphone may comprise a radio frequency wireless transmission module that may be arranged to transmit the second output signal. The first and/or second wireless microphone(s) may also be arranged to receive wireless signals (i.e. the first and/or second wireless microphone(s) may comprise a wireless transceiver). For instance, the first and/or second wireless microphone(s) may be arranged to receive wireless control signals for controlling one or more parameters of the microphones (e.g. gain, configuration of the visual or audible identification, etc.).

In some embodiments, the first wireless microphone may comprise a local storage module (i.e. provided on-board the first wireless microphone) to which the first wireless microphone is arranged to store the first output signal. Similarly, the second wireless microphone may be arranged to store the second output signal to a local storage module. Storing the first and/or second output signal(s) locally may allow the first and/or second audio signal(s) to be stored at a higher quality than that at which it is practical or possible to transmit the audio signal(s) wirelessly. This is because the quality at which a signal can be stored locally is typically not impacted by factors which can affect wireless transmissions (such as limits on bandwidth, transmission power or the presence of wireless interference).

Figure 2:
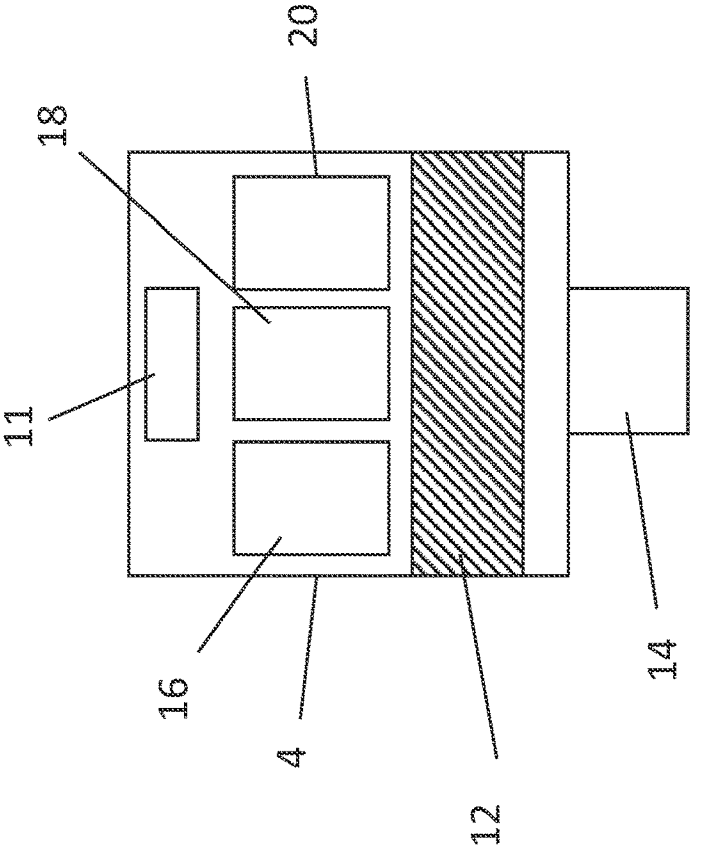
FIG. 2 shows a wireless microphone of the system of FIG. 1 in more detail.

The first wireless microphone 4 of the exemplary embodiment is shown in more detail in FIG. 2 and comprises a first microphone element 11, a first visual feature 12 and a first electrical connector 14 along with a local storage module 16, a wireless transceiver 18 and a battery 20. The first visual feature 12 comprises a section of the housing of the first wireless microphone 4 and has a first colour (e.g., red). Similarly, the second wireless microphone 6 comprises a second microphone element 22, a second visual feature 24 and a second electrical connector 26, along with a local storage module, a wireless transceiver and a battery. The second visual feature 24 comprises a section of the housing of the second wireless microphone 6 and has a second colour (e.g., blue).

In other embodiments the visual feature may be something other than a colour, for example a symbol, an alphanumeric character or string of characters, a coloured light or light pattern, or something similar. Instead of a visual feature, some embodiments may have an audible feature, for example a sound file stored in local storage module 16. Such a sound file can be played if a user performs some predetermined action such as pressing a button, shaking the microphone, transmitting a control signal to the microphone, etc.

In some sets of embodiments the first and/or second visual or audible feature may be changeable (e.g. between audio captures), to allow a single wireless microphone to be associated with different identifying features (e.g. colours) dependent on user selection. For example, the first and/or second visual feature may comprise a removable (i.e. replaceable) coloured portion of a microphone housing. In some embodiments the first and/or second visual feature may comprise at least one configurable indicator such as a light source operable to emit different colours of light depending on its configuration (e.g. a coloured LED configurable through user input and/or via software). The colour (s) of the configurable indicator(s) may be assigned before recording begins via a wired connection (e.g. when the first and/or second wireless microphones are connected to a base station) or a wireless connection (e.g. using a wireless control signal).

In such embodiments the information identifying the first and/or second microphones is updatable to ensure it is consistent with the visual feature currently in use. The first and/or second wireless microphone(s) may be arranged to update automatically the information identifying the first and/or second visual or audible features when the associated visual feature is changed (e.g. as part of the configuration of the light source or through automatic detection of the visual feature that is in use). Alternatively, the information identifying the first and/or second colours may be updated manually by a user.

In the embodiments described above, wherein the output signal is stored in a local storage module in, the first and/or second wireless microphone(s) may be arranged to subsequently transmit the stored output signal(s) over a wireless connection after audio capture has finished. For instance, a lower quality version of the first audio signal or the first output signal may be transmitted wirelessly in real time (or near-real time, taking account of inherent system latencies), with a higher quality version being stored on the local storage and then transmitted subsequently.

In some embodiments, the first wireless microphone comprises a wired electrical connector (e.g. comprising one or more electrical contacts) for transmitting the stored first output signal. Similarly, the second wireless microphone may comprise a wired electrical connector for transmitting the second output signal. For example, the wired electrical connector(s) of the first and/or second wireless microphone (s) may be adapted to connect the first and/or second wireless microphone(s) to another device (e.g. a base station or a computer) to which the output signals can be downloaded from the local storage (e.g. after audio capture has finished).

In some embodiments, including the one illustrated in FIG. 1, the wireless microphone system comprises a base station. The base station may comprise at least one wired electrical connector for connecting to a wired electrical connector of the first and/or second wireless microphone(s). For example, the base station may comprise a docking portion to which the wired electrical connector(s) of the first and/or second wireless microphone(s) are arranged to connect directly (thus removing the need for a separate connecting cable).

The base station may be arranged to receive the first and/or second output signal(s) from the first and/or second wireless microphone(s) (e.g., in real time or near-real time during audio capture, or after audio capture is complete). The base station may be arranged to receive first and/or second output signal(s) via a wired electrical connector (e.g., via a cable or through docking). For example, a user may dock the first and/or second wireless microphone(s) to the base station after audio capture has finished to download the first and/or second output signal(s) to the base station. In some embodiments, the wired electrical connector(s) of the base station may be arranged to charge a battery of the first and/or second wireless microphone(s) (e.g. at the same time as receiving the first and/or second output signal(s)). In some embodiments, the wireless microphone system may comprise a dock device (e.g. a dedicated dock device separate to the base station) with wired electrical connector(s) for charging and/or transferring data to and/or from the wireless microphone(s). The dock device may also be arranged to charge and/or transfer data to and/or from other devices such as the base station or other wireless microphones. The dock device may therefore not need to be adapted for wireless communication (e.g. for receiving the output signal) and may simply provide a convenient way to charge and/or transfer data to/from the wireless microphone(s) over a wired connection.

The base station may comprise first and second wired electrical connectors (e.g. sockets and/or docking portions) for connecting respectively to the first and second wireless microphones. In such embodiments the first and second wired electrical connectors may allow the first and second wireless microphones may be connected simultaneously, e.g. enabling the first and second output signals to be downloaded simultaneously and/or the batteries of the first and second wireless microphones to be charged simultaneously, increasing convenience.

The first wired electrical connector of the base station may comprise a visual feature having the first identification, e.g. a first colour (i.e. to match the first visual feature of the first wireless microphone). Correspondingly, the second wired electrical connector of the base station may comprise a visual feature having the second identification, e.g. a second colour.

In the embodiment in FIG. 1, the base station 8 comprises a first docking portion 28 with a first electrical connector 30 and a second docking portion 32 with a second electrical connector 34. The first and second wireless microphones 4, 6 are configured to dock with the first and second docking portions 28, 32 to form a wired electrical connection (i.e. such that the electrical connectors 14, 26 of the wireless microphones 4, 6 contact the electrical connectors 30, 34 of the base station 8). The first docking portion 28 comprises a section with the first colour, to match the first wireless microphone 4. The first docking portion 28 comprises a section with the second colour, to match the second wireless microphone 4.

In embodiments in which the first and/or second visual feature comprises a configurable indicator (e.g., one or more configurable LEDs), the base station may be arranged to assign a colour to the configurable indicator (i.e., to select what colour the first or second colour is). The base station may be arranged to assign a colour to the first and/or second microphone device via the wired electrical connector(s) and the assignment may be triggered by connection of the wired electrical connector(s). For example, when the first and/or second microphone device is docked with a docking portion of the base station, the base station may assign a colour to the first or second microphone device that matches a colour of a visual feature of the docking portion with which that microphone device is docked.

The base station 8 may comprise a wireless reception module 36 and/or a wireless transmission module (e.g. a wireless transceiver module) 38 arranged to send and/or receive signals to/from the first and/or second wireless microphone(s) (i.e. to and/or from a wireless transceiver of the first and/or second wireless microphone 18; 118). In some embodiments, the base station 8 may act as an intermediary (i.e., a router) between the wireless microphones 4, 6 and a monitoring device 10 or an editing device 15, receiving the output signals from the wireless microphones 4, 6 and relaying them to the monitoring device 10 or the editing device 15. In some such embodiments, the base station 8 may send additional information to the monitoring device 10 or the editing device 15 along with the output signals. For example, the base station 8 may be arranged to determine position information relating to the first and/or second wireless microphone(s) 4, 6 (e.g. a position of the wireless microphone(s) relative to the base station) and then transmit this information to the monitoring device 10 or the editing device 15 with the output signals.

For determination of position by the base station 8, some embodiments of the invention include, in the base station 8, a microphone array 39. The microphone array 39 may include a plurality of microphone elements physically arranged such that they produce audio signals from which a spatially encoded sound-field signal may be generated. In some embodiments the base station 8 may be arranged to produce the spatially encoded signal locally and transmitting the sound field signal to the monitoring device 10 and/or the editing device 15. In other embodiments the plurality of local audio signals produced by the microphone array 39 are transmitted to the monitoring 10 or editing device 15, or some remote computer, in real or near real time, or subsequently for later production of the spatially encoded signal in the editing device 15 or at a remote location.

When the base station 8 receives the first and the second output signal from the first 4 and the second 6 wireless microphone, the received audio signals can be combined with the signals from the microphone array 39 to produce a spatially encoded sound-field signal which includes the signals from the wireless microphones 4, 6. Furthermore, the position of the first and second wireless microphones 4, 6 may be determined. The position(s) may be determined using audio analysis techniques. For example, the respective first and second positions of the first and second microphones 4, 6 (relative to the base station) may be determined by comparing the first and second audio signals to the output from the microphone array (e.g., to identify time delays between sounds captured by the first and second microphones and the microphone array of the base station and to use these delays to calculate the distance between the base station and the first and second wireless microphones). Additionally or alternatively, the first and/or second position (s) of the first and/or second wireless microphones may be determined by analysing radio signals sent to or from the first and/or second wireless microphone(s) (e.g. wireless communication signals sent between the wireless microphone(s) and a base station).

A more detailed discussion of creation of spatially encoded signals and determination of microphone positions can be found in the same applicant's international (PCT) patent application with application number PCT/NO2020/050320, which is hereby incorporated by reference in its entirety.

In some embodiments, the base station 8 is arranged to relay only part of the output signal(s) to the monitoring device 10. For example, the base station 8 may not transmit the audio signal(s) to the monitoring device 10, instead transmitting only what is necessary for visual monitoring (e.g. information identifying the first and/or second colours along with determined position information and/or an indication of which audio signal is dominant at a particular time). The base station 8 may store the part(s) of the output signal(s) it does not transmit to the monitoring device 10.

Figure 4:
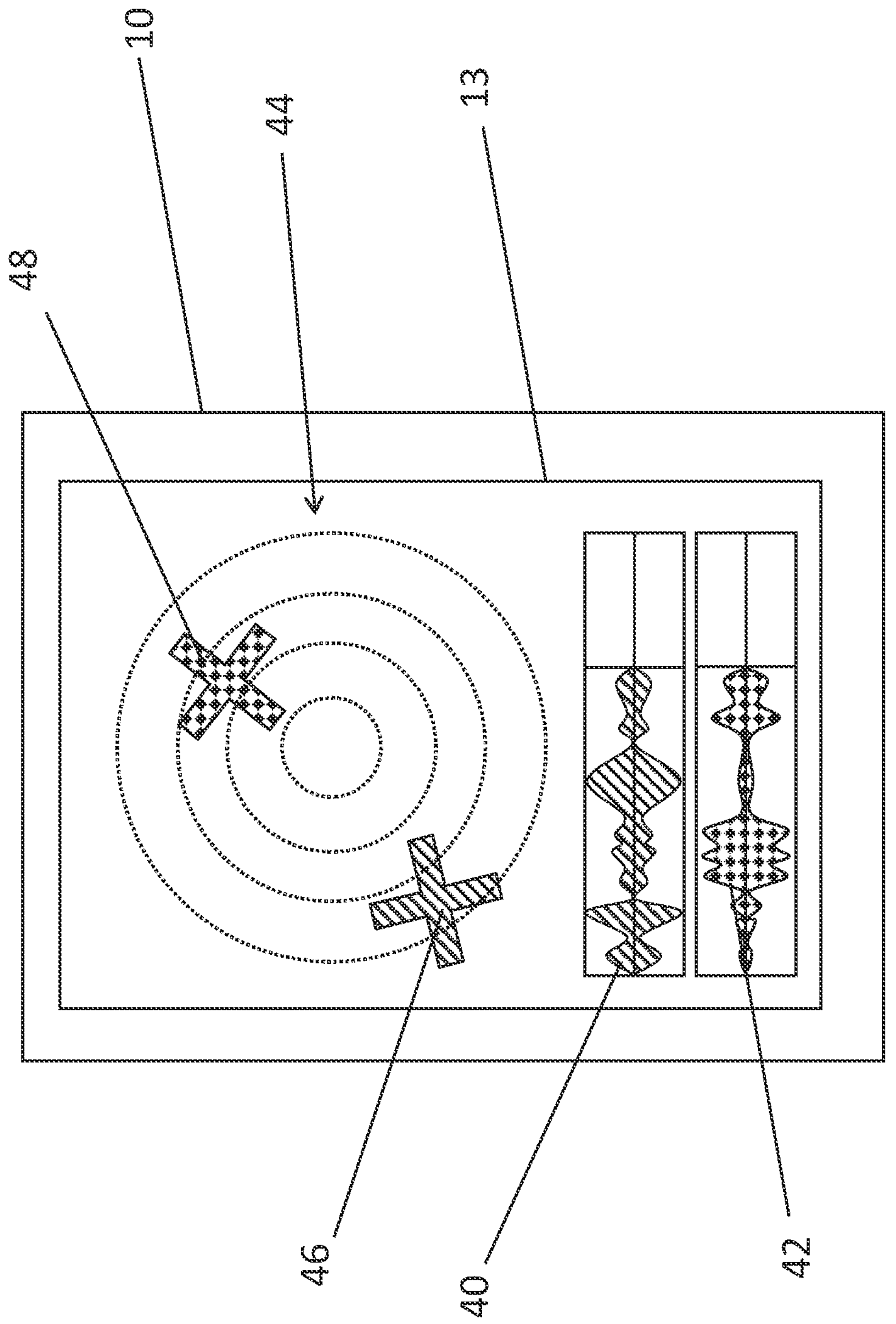
FIG. 4 shows the monitoring device of the system shown in FIG. 1 in more detail.

In the embodiment shown in FIG. 1, the monitoring device 10 (e.g. a tablet computer or a smartphone) comprises a display 13. In this embodiment the editing device 15 is a component of the monitoring device, for example a computer program installed on the monitoring device 10 for execution by a processor 17 of the monitoring device 10. In other embodiments the editing device may be a separate device or even a service residing on a remote computer, for example as a cloud service. The operation of the monitoring device 10 is explained in more detail below with reference to FIG. 4, in which the content displayed on the display 13 of the monitoring device 10 is shown in more detail.

In use, the first microphone element 11 of the first wireless microphone 4 produces a first audio signal comprising sound in the vicinity of the first wireless microphone 4. For example, the first wireless microphone 4 may be secured to the clothing of a first person so that the first audio signal is dominated by the sound of the first person speaking. Similarly, the second microphone element 22 of the second wireless microphone 6 produces a second audio signal comprising sound in the vicinity of the second wireless microphone 6 (e.g. dominated by the speech of a second person to which the second wireless microphone 6 is secured).

The first microphone 4 produces a first output signal which comprises the first audio signal and information identifying the first colour of the first visual feature 12. For example, the first wireless microphone 4 may embed information identifying the first colour of the first visual feature 12 as an inaudible audio watermark in the first audio signal to produce the first output signal. For instance, the audio watermark may be realised by defining a set of pseudo-noise (PN) sequences mapped to different colours, with the least significant bits (LSB) of the PN sequences corresponding to a colour according to a predetermined look-up table. The LSB may be modified in sections where the audio signal masks the watermark. In other embodiments the identifying information may be something other than a colour, as described above, and the embedded information may reflect this.

In this example, the first wireless microphone 4 stores the first output signal to its local storage portion 16, but this is not essential. Correspondingly, the second wireless microphone 6 produces a second output signal comprising the second audio signal and information identifying the second colour of the second visual feature 24.

The first microphone 4 transmits the first output signal in real time via its wireless transceiver 18 to the monitoring device 10 (e.g., directly or via the base station 8). The monitoring device 10 receives the received first output signal and recovers the first audio signal and the information identifying the first wireless microphone, for example reference to a first colour, therefrom. For instance, when the first colour is encoded as an inaudible audio watermark in the first audio signal, the colour (or other feature in other embodiments) may then be extracted by filtering the encoded signal LSB sequence using matched filters for each PN sequence realized as one-bit correlators. If a matched filter returns "1" on the output this means a watermark corresponding to the given PN sequence is detected. The corresponding colour can then be determined with reference to aforementioned look-up table. The monitoring device 10 then uses the first audio signal and the first colour to produce a visualisation 40 of the first audio signal (i.e. a waveform) on the display 13 (see FIG. 4), in the first colour of the first visual feature 12.

The second microphone 6 transmits the second output signal in real time to the monitoring and editing device 10 (e.g. directly or via the base station 8), which displays a visualisation 42 of the second audio signal in the second colour (of the second visual feature 24) alongside the visualisation 40 of the first audio signal.

The coloured visualisations 40, 42 enable a user of the monitoring and editing device 10 to identify intuitively and easily which audio signal corresponds to which wireless microphone during an audio capture session simply by matching the colour of a visualisation to that of the visual feature of a wireless microphone.

In embodiments where the identifying feature is something other than a visual feature with an identifying colour, the visualisation 40, 42 may be associated with some other identification, for example a symbol, an alphanumerical string, a name, etc. displayed in proximity to the respective visualisations 40, 42.

In some audio capture scenarios (e.g. a conference call), at a given point in time there is one sound source that is the primary contributor to the overall audio (e.g. a single person talking). In such scenarios it may be useful during monitoring and/or editing to identify the primary contributor (e.g. to highlight or emphasize the audio signal containing the primary contributor).

In some embodiments, therefore, the monitoring device or the editing device is arranged to display a visualisation of a combined signal comprising the first and second audio signals. The system may be arranged to determine one of the first and second audio signals to be a primary contributor to the combined signal. The monitoring or editing device may be arranged to highlight or emphasise the primary contributor to the combined signal. For example, the visualisation of the combined signal may consist of the first audio signal at times when it is the primary contributor and the second audio signal at times when it is the primary contributor. In some embodiments the combined signal has the first colour when the first audio signal is the primary contributor and the second colour when the second audio signal is the primary contributor.

Figure 5:
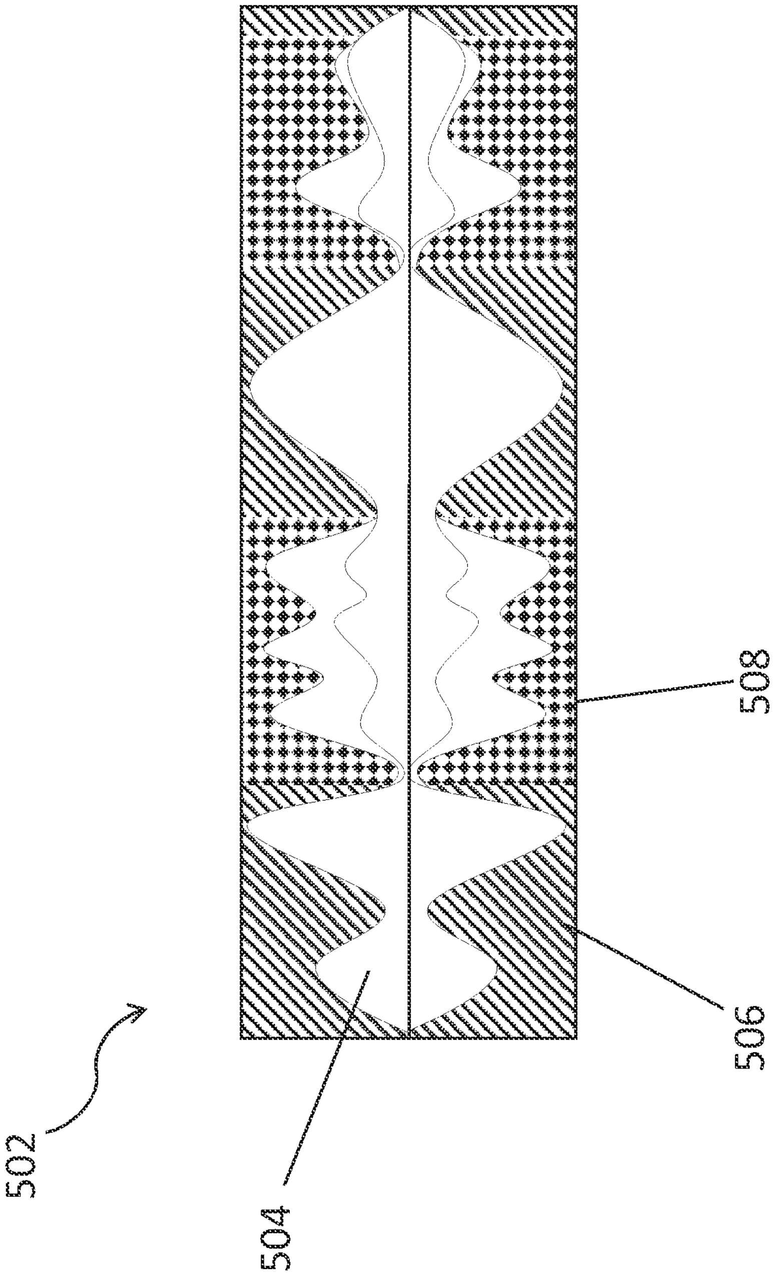
FIG. 5 shows an alternative visualisation of first and second audio signals.

In the exemplary embodiment this is illustrated in FIG. 5, where audio has been captured from several sound sources (e.g., several people talking), and one sound source dominates over the others at any given time (e.g. when one person is talking and the others are silent). As mentioned above, it may be useful to identify this principal sound source. FIG. 5 thus shows an alternative visualisation 502 that may be shown on the display 13 of the monitoring device 10 which includes an indication of which audio signal currently contains the principal sound source of the sound scene. The alternative visualisation 502 comprises a waveform of a combined audio signal 504 made from the first and second audio signals (e.g. comprising a superposition of the first and second audio signals). The visualisation 502 is split into several time periods in which a different audio source is dominant. In a first time period 506, the first audio signal is dominant (e.g. has a larger amplitude than the second audio signal), and in a second subsequent time period 508 the second audio signal is dominant. To enable a user to identify quickly and intuitively which of the first and second wireless microphones is associated with the principal sound source at that moment in time, the first time period 506 (and other time periods in which the first audio signal is dominant) is coloured with the first colour and the second time period 508 (and other time periods in which the second audio signal is dominant) is coloured with the second colour.

The specific criteria used for determining which audio signal should be considered the primary contributor to a combined signal may vary in different embodiments of the invention, or may be a configurable parameter. In a situation where several people take turns in talking, such as, for example, in a dialog, a panel discussion, or a video conference, it may simply be sufficient to determine which audio signal has the highest amplitude, power, or energy. However, this is not the only criterion that may be used. Other possibilities include basing the determination on the determined position of the wireless microphones. For example, the primary contributor may be the audio signal originating from the wireless microphone determined to be the one that is closest to the base station, the one that is closest to a centre line (or symmetry line) of a sector originating at the position of the base station and thus in the centre of a sound field (e.g., equally loud in two stereo channels), or the one with best channel separation from other audio signals. The specific mathematical modelling of such criteria can vary and may depend on the method used for determining position but may include use of relative power of the respective signals, cross-correlation, crosstalk (channel bleed), and more.

In addition to signal strength and absolute or relative microphone position, other types of criteria may also be used. Machine learning may be used to determine relative speech intelligibility for the respective signals, or machine learning or traditional pattern recognition may be used to search for specific types of sound, such as bird chirps, traffic noise, speech, specific musical instruments, and the like. By using speech recognition technology it may even be possible to identify the audio signal with the most relevant content based on text searching and topic identification.

The process of determining the primary contributor to a combined signal may in different embodiments be performed in different parts of the system, including the base station 8, the monitoring device 10, and the editing device 15.

In embodiments where the wireless microphone system is arranged to determine first and/or second position(s) of the first and/or second microphone(s) during audio capture, the monitoring device and/or the editing device may be arranged to associate visually on a display the first position with the first colour, or some other first information identifying the first wireless microphone, and/or the second position with the second colour or, again, some other second information identifying the second wireless microphone. For example, the monitoring and/or editing device may be arranged to display a first visual indicator (e.g., a symbol, label, or icon) with the first colour at a position on the display that corresponds to the position of the first microphone in reality. Of course, the monitoring and/or editing device may be arranged to display a second visual indicator (e.g., a symbol, label, or icon) with the second colour at a position on the display that corresponds to the position of the second microphone in reality.

Providing a visual indicator of the positions of the first and/or second wireless microphone(s) on the monitoring device and/or the editing device may enable a user to very quickly locate and identify the first and/or second microphone. For example, during audio capture a user may be able to quickly locate a particular microphone even if it is out-of-sight of (e.g. behind) the user.

Thus, the wireless microphone system 2 of the exemplary embodiment is arranged to determine the positions of the first and second wireless microphones 4, 6 during audio capture. For example, the monitoring device 10 may be arranged to analyse RF signals received from the wireless RF transceivers 18 of the first and second microphones (e.g. that are carrying the first and second output signals) to determine a first position of the first wireless microphone 4 and a second position of the second wireless microphone 6. Alternatively, the base station 8 may be arranged to determine the positions of the wireless microphones 4 and 6 and to transmit this on to the monitoring device 10. The monitoring device 10 uses this information to produce a visualisation 44 of the positions of the wireless microphones 4, 6 on the display 13. The visualisation 44 comprises a first symbol 46 indicating the first position (of the first wireless microphone 4) and a second symbol 48 indicating the second position (of the second wireless microphone 6). The first symbol 46 has the first colour (i.e. matching that of the first visual feature 12) and the second symbol 48 has the second colour (i.e. matching that of the second visual feature). A user of the monitoring device 10 may thus utilise the visualisation 44 (e.g. in combination with the aforementioned visualisations of the first and second audio signals 40, 42) to locate and identify easily a particular wireless microphone (e.g. even if the wireless microphone is located out of view at first).

In other embodiments, symbols, numbers, or names may be used instead of colours to identify the respective wireless microphones.

Once an audio capture is complete, the first and second wireless microphones 4, 6 are docked to the first and second docking portions 28, 30 of the base station 8 to form a wired electrical connection between the wireless microphones 4, 6 and the base station 8. The first and second output signals are then downloaded to the base station 8 over this wired electrical connection. The batteries of the first and second wireless microphones 4, 6 are simultaneously charged over the wired electrical connection. Because the wired electrical connection may not be subject to the same limitations as a wireless connection (e.g. limited bandwidth, transmission power or interference) the output signals may be transferred more quickly and/or a higher quality version of the audio signals may be transferred. Once the first and second output signals have been transferred to the base station 8 they may be transferred elsewhere (e.g. over an internet connection) for review or post-processing (e.g. to produce an immersive soundtrack). The base station 8 may itself include a user interface and display for reviewing or editing the downloaded output signals.

The monitoring device 10 may also comprise an editing device 15 with which a user can perform one or more post-processing techniques to the first and/or second audio signal(s). For example, the editing device 15 may be used to generate a spatially-encoded soundtrack in which the determined positions of the first and second wireless microphones are used to accurately position the first and second audio signals within a sound scene. In such embodiments, because the first and second colours are associated with the first and second audio signals on a technical level, a visual association between the two (e.g. with coloured waveforms) may be provided automatically throughout an editing or post-processing process, making it easier and more intuitive for a user to keep track of which audio signal is which at all stages of production. The technical level association between the colours, or some other identification feature, and the audio signals provided by the invention is thus beneficial even in embodiments that do not comprise a device for live monitoring.

If the captured audio signals are used to generate a spatially encoded sound-field signal, the visualisation and knowledge of the actual position of a wireless microphone during sound capture can be utilized to edit the spatially encoded signal to "move" a signal component, e.g., the first audio signal, to a different position in the sound-field. The consistent identification a positioning of each source makes it easier to determine whether a given audio signal is positioned correctly according to a desired design of the overall sound-field. This provides a sound engineer with the ability to rely on more than his or her own ears when determining how to edit a spatially encoded sound-field signal. The editing may even be subject to automatic processing by software based on available information provided by the present invention, including identity, position, and primacy of each audio signal in the sound-field.

Figure 3:
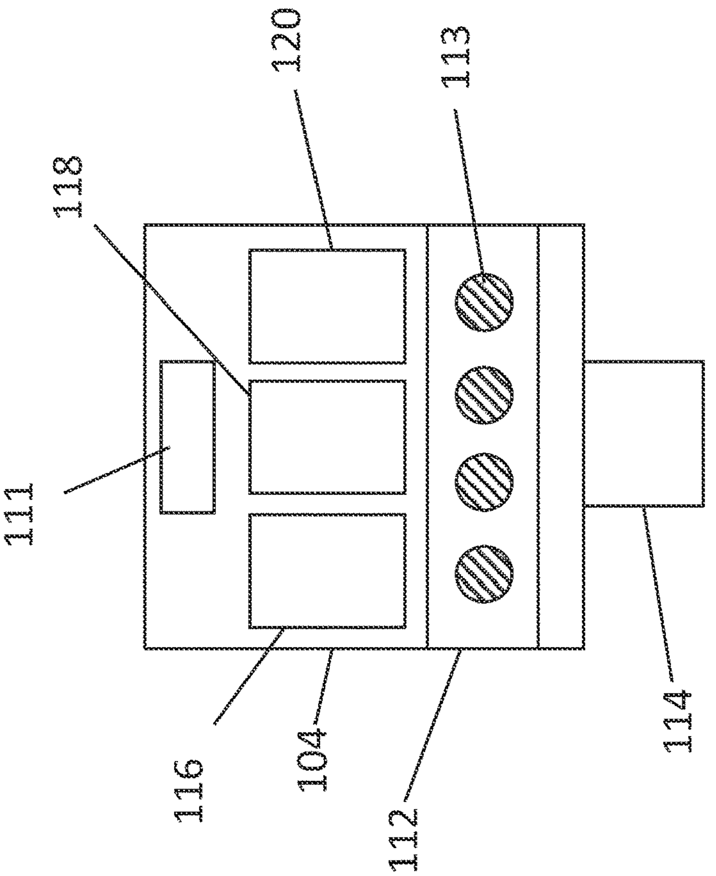
FIG. 3 is a schematic view of an alternative wireless microphone.

An alternative wireless microphone 104 is shown in FIG. 3 (e.g. that may be used in place of the first and/or second wireless microphone(s) 4, 6 in the system 2 described above). The wireless microphone 104 comprises a microphone element 111, a configurable visual feature 112 and a first electrical connector 114 along with a local storage module 116, a wireless transceiver 118 and a battery 120. The general operation of the wireless microphone 104 is similar to that of the first and second wireless microphones 4, 6 described above.

The configurable visual feature 112 comprises a plurality of RGB LEDs 113, which are configurable to emit light of a particular colour in response to a corresponding software or hardware setting. The colour of the visual feature 112 may therefore be configured by changing the corresponding setting. For example, each time the wireless microphone 104 is used, a random colour for the LEDs 113 may be selected by software. Alternatively, a user may select a specific colour for the LEDs 113 (e.g. for a particular audio capture session).

In use, the microphone element 111 of the wireless microphone 104 produces an audio signal comprising sound in the vicinity of the wireless microphone 104. The wireless microphone 104 also produces an output signal which comprises the audio signal along with information identifying the colour of the visual feature 112 (i.e. the colour of the LEDs 113) as the audio signal is captured. Because the colour of the LEDs 113 is configurable (i.e. it may change between audio captures), it is especially useful to keep a record (with the output signal) of what colour the LEDs 113 were when a particular audio signal was being captured.

The invention has been described in terms of an exemplary wireless microphone system. According to another aspect of the invention a method is provided for capturing and processing audio using such a system. An embodiment of this method is illustrated in FIG. 6.

Figure 6:
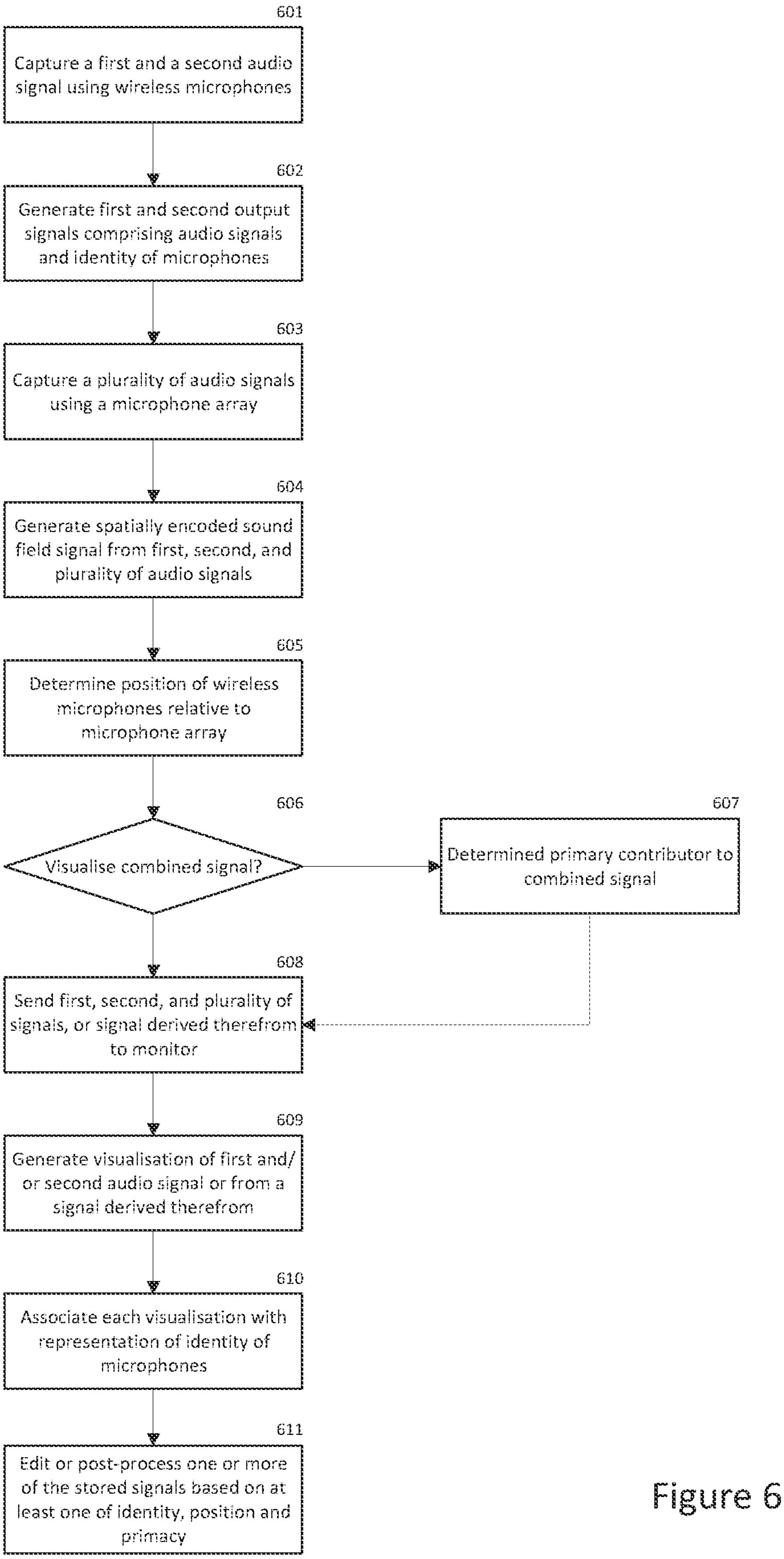
FIG. 6 shows a flow chart of a method for use in a wireless microphone system.

The embodiment shown in FIG. 6 includes a number of steps that are not necessarily included in all embodiments of the invention. Consequently, many embodiments may leave out several of the steps illustrated, and some embodiments may perform the steps in a different sequence. As such, the method according to the invention should not be construed as being limited to this embodiment, but also includes subsets of steps performed in any order possible, meaning that the only requirement is that steps that produce input intended to be processed by another step must be performed in a sequence that makes this possible. It should, however, also be understood that many of the illustrated steps are processes that are running concurrently, not discrete steps that are performed and concluded before a following step can be initiated.

It should also be noted that the illustrated method does not strictly specify where each step is performed (e.g., in the base station, the editing device, or the monitoring device) or where signals are stored before processing (e.g., locally in the wireless microphones, in the base station, in the editing or monitoring device, in a remote computer, or not stored at all and only processed in real time or near real time). These alternatives are discussed above and are not essential for the understanding of the steps or sub-processes of the method.

Having this in mind, reference is made to a first step 601 where first and second audio signals are captured using wireless microphones. In a next step 602 corresponding first and second output signals are generated. The output signals are generated by adding information identifying the first and second wireless microphones to the audio signals. In other words, the output signals are the audio signals with added microphone identity information. How the output signals are generated and how they are transmitted and/or stored are discussed above.

In some embodiments, in a next step, or more precisely concurrently with the capture performed by the wireless microphones, a plurality of local audio signals are captured in step 603 using a microphone array. The plurality of local audio signals may be suitable for generating a spatially encoded sound-field signal in step 604. Such a signal may be generated only from the plurality of local audio signals from the microphone array, or the first and second audio signals may be incorporated in the sound-field signal at this stage. In embodiments where the sound-field signal is generated only from the plurality of local audio signals, the first and second audio signals from the wireless microphones may be edited into the sound-field signal during a later editing process.

In some embodiments a next step 605 determines the relative position of the wireless microphones to the microphone array. How this determination may be performed is discussed above.

In step 606 it is decided or determined whether a visualisation should be based on one or more separate signals (e.g., one visualisation for each wireless microphone, and possibly also one for the spatially encoded sound-field signal), or from a combined signal. It should be noted that this is not necessarily a step that is actually performed by the method but may be a decision that is made during design or configuration of the system. A combined signal may be a superposition (or addition) of the wireless microphone signals, it may be a signal that switches back and forth between wireless microphone signals, it may be the sound field signal incorporating information from the first and second audio signals, or it may be some other signal derived from the first and second audio signals.

If the visualisation is one of (or one including) a combined signal, it may be determined in step 607 which audio signal is the primary contributor to the combined signal. What this means and how it is performed is discussed above.

In a next step 608 at least one of the first, the second, and the plurality of local audio signals originating from the first wireless microphone, the second wireless microphone, and the microphone array, respectively, are sent to a monitoring device. Alternatively, or additionally, a signal derived from one or more of these signals are sent, for example a spatially encoded sound field signal.

In step 609 a representation of at least one of the first audio signal, the second audio signal, or a signal derived therefrom. Such a derived signal may be the combined signal as described above. The visualisation may be based on one or more aspects of the signal, including the position of the originating wireless microphone relative to the microphone array.

Each visualisation is associated, in step 610, with a representation of the identity of the originating wireless microphone, or the wireless microphone that contributed the primary contribution to a combined signal. The visualisation may be a colour, a symbol, a pattern, a number, a string of alphanumerical characters, or some other feature that can readily be associated with the identity information in the output signals and with visual or audible identifying features of the wireless microphones, as discussed above.

The visualisation may be presented during audio capture in order to assist an engineer or producer during setup and recording. Furthermore, some embodiments of the invention generate the visualisations in conjunction with playback and editing or post-processing of the recorded audio files. In step 611 one or more of the stored signals, i.e., audio and/or output signals, combined signals, derived signals, including spatially encoded sound-field signal, are edited or post-processed. The editing or post-processing may utilize the identity information included in the output signals of step 602, the position information determined in step 605, and primacy information determined in step 607. This information may be used by a sound engineer during manual editing, or may be used as input to automatic processes that edit the stored signals according to some predetermined script or specifications.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

A single physical device (e.g. a tablet computer or a smartphone) may comprise any combination of a monitoring device, an editing device and a storage device. In other embodiments the monitoring device, editing device, and storage device may be implemented as separate components. Either one or all of them may also be implemented as or on one or more remote computers reachable over a communication network such as the Internet, for example as cloud services. In embodiments where one or more devices are implemented as cloud based services, the display device will be implemented as a service capable of generating a graphical representation that can be transmitted over a network in order to be displayed by a client or user agent, for example a web browser or an app, installed on a user device.

Features of any aspect or embodiment described herein may, wherever appropriate, be applied to any other aspect or embodiment described herein. Where reference is made to different embodiments, it should be understood that these are not necessarily distinct but may overlap.

The present invention has been described above with reference to a system comprising two wireless microphones. However, the invention of course extends to systems comprising more than two wireless microphones, e.g. three, four, five or more wireless microphones. In such systems each wireless microphone comprises a visual feature with a unique colour.

To the extent that features or embodiments are disclosed herein but not covered by the appended claims, they are not abandoned by the applicant, who reserves the right to file amended claims or divisional applications in order to capture such embodiments. Some such combinations of features are discussed below.

The monitoring device and/or the editing device may comprise a display. The monitoring device and/or the editing device may be arranged to associate visually on the display the first audio signal (e.g. as a waveform) with the first colour and/or the second audio signal with the second colour. For example, the monitoring device and/or the editing may be arranged simply to display the first audio signal in the first colour and/or to display the second audio signal in the second colour. This may aid live monitoring of audio capture or facilitate editing after audio capture (e.g. by helping a user identify quickly which microphone is which). Because the first output signal links the first audio signal to the first colour, the first audio signal can be quickly and easily associated with the first wireless microphone simply by looking for the microphone with the first colour. A user monitoring the first and second output signals may immediately determine that the first audio signal was captured by the wireless microphone with the first visual feature (i.e. the first wireless microphone) and the second audio signal was captured by the wireless microphone with the second visual feature (i.e. the second wireless microphone).

For example, if a user monitoring the first and second output signals notices that there is an issue with the first audio signal (e.g. that it is too quiet), they can immediately identify (by visually identifying the first visual feature with the first colour) which wireless microphone to adjust to remedy the issue (e.g. to change its positioning so it is closer to a sound source). Similarly, the process of identifying which audio signal is associated with which sound source during post-processing (i.e. after audio capture) may be made more convenient because the first and second audio signals are inherently linked in the output signals with information identifying the first and second colours.

In some embodiments the first and/or second visual feature is arranged to be visible during use of the first and/or second microphone. For example, the first and or second visual feature may comprise a portion of the microphone housing that is visible when the first and/or second microphone is in an audio capture configuration (e.g. attached to a sound source).

Of course, it may equally be desirable in some embodiments to conceal or otherwise disguise the first and/or second wireless microphone(s) during audio capture (e.g. for some video productions it may be desirable for aesthetic reasons to see and hear a sound source without seeing the microphone that is capturing sound from that sound source). In some embodiments, therefore, the first and/or second wireless microphone(s) may be arranged such that the first and/or second visual feature (which may be designed to be distinctive, e.g., brightly coloured) is concealed, or concealable, during use of the first and/or second microphone. For example, in such embodiments the first and/or second visual feature may comprise a portion of a microphone housing that may be concealed when the first and/or second wireless microphone(s) is in use. For example, the first and/or second wireless microphone(s) may comprise a clip arranged to secure the wireless microphone to a person's clothing and the first and/or second visual feature may comprise a part of the wireless microphone or the clip that is designed to be concealed by the person's clothing when attached. In such embodiments the visual feature may still be revealable when necessary (e.g. by the person unclipping the microphone prior to, during or after audio capture).

The first colour is preferably easily distinguished from the second colour, to reduce the likelihood of confusion and ensure quick and simple identification of the wireless microphone corresponding to a particular audio signal. The first colour may comprise a complementary or contrasting colour to the second colour. The first and second colours may include black, white and shades of grey. In some embodiments the first and second colours may be selected from a list comprising: red, green, blue, yellow, purple, black, white, pink, brown and orange.

The information identifying the first and/or second colour may simply be appended to the first and/or second audio signal(s) to produce the first and/or second output signal(s) (e.g. as metadata included in a first or last portion of the output signal such as a file header). Additionally or alternatively, the information identifying the first and/or second colour may be transmitted as a part of a separate wireless signal to the first and/or second audio signal(s) (i.e. such that the first and/or second output signal comprises two separate wireless signals). In some embodiments, however, the first and/or second output signal(s) may comprise the first and/or second audio signal(s) but modified to embed the information identifying the first and/or second colour therein. For example, the information identifying the first and/or second colour may be contained in an inaudible audio watermark signal added to the first and/or second audio signal(s) (e.g. in a time or frequency region of the audio signal that does not impact on the captured audio). This may allow the output signal(s) to be handled (e.g. transmitted via the wireless transmission module) using standard audio equipment (e.g. a standard wireless audio transmission module) with little or no modification. The encoded audio can then be subsequently decoded (e.g. by a receiving device) to recover the information identifying the and/or second colour.

The information identifying the first and/or second colour may comprise a description of the colour itself (e.g. "red" or "blue" or RGB values), or alternatively it may comprise a reference to a look-up table containing several possible colours.

A wireless microphone system may include:

a first wireless microphone comprising a first microphone element arranged to generate a first audio signal, and a first visual feature having a first colour, wherein the first microphone is arranged to generate a first output signal that comprises the first audio signal and information identifying the first colour; and a second wireless microphone comprising a second microphone element arranged to generate a second audio signal and a second visual feature having a second colour different to the first colour, wherein the second microphone is arranged to generate a second output signal that comprises second audio signal and information identifying the second colour.

In the wireless microphone system the first wireless microphone may comprise a local storage module to which the first output signal is stored.

A wireless microphone system as described above, wherein the first wireless microphone comprises a wireless transmission module arranged to transmit the first output signal.

The wireless microphone system above, wherein the first wireless microphone comprises a wired electrical connector arranged to transmit the first output signal.

The wireless microphone system described above, wherein the first and/or second visual feature comprises a permanent visual feature.

A wireless microphone system, wherein the first and/or second visual feature comprises a permanently coloured portion of a microphone housing.

A wireless microphone system, wherein the first and/or second visual feature comprises a non-permanent visual feature.

A wireless microphone system, wherein the non-permanent visual feature comprises a light source operable to emit different colours of light depending on its configuration.

A wireless microphone system, wherein the first and/or second visual feature is arranged to be visible during use of the first and/or second microphone.

A wireless microphone system, wherein the information identifying the first and/or second colour(s) is appended to the first and/or second audio signal(s).

A wireless microphone system, wherein the information identifying the first and/or second colour(s) is transmitted as a part of a separate wireless signal to the first and/or second audio signal(s).

A wireless microphone system, wherein the information identifying the first and/or second colour is contained in an inaudible audio watermark signal added to the first and/or second audio signal(s).

A wireless microphone system, further comprising a base station arranged to receive the first and second output signals.

A wireless microphone system, wherein the base station is arranged to receive the first and second output signals via a wired connection.

A wireless microphone system, further comprising a monitoring or editing device with a display, wherein the monitoring or editing device is arranged to receive the first and second output signals.

A wireless microphone system, wherein the monitoring or editing device is arranged to associate visually on the display the first audio signal with the first colour and the second audio signal with the second colour.

A wireless microphone system, wherein the system is arranged to determine respective first and second positions of the first and second microphones and the monitoring or editing device is arranged to associate visually on the display the first position with the first colour and the second position with the second colour.

A wireless microphone system, wherein the monitoring or editing device is arranged to display the first audio signal and/or the first position in the first colour and to display the second audio signal and/or the second position in the second colour.

A wireless microphone system, wherein the monitoring or editing device is arranged to display a visualisation of a combined signal comprising the first and second audio signals, wherein the system is arranged to determine one of the first and second audio signals to be a primary contributor to the combined signal, and wherein the visualisation of the combined signal has the first colour when the first audio signal is the primary contributor and the second colour when the second audio signal is the primary contributor.

A wireless microphone comprising a microphone element arranged to produce an audio signal; and a visual feature having a unique colour; wherein the microphone is arranged to generate an output signal comprising the audio signal and information identifying the unique colour.

The invention claimed is:

1. A wireless microphone system, comprising:

a first wireless microphone with a first microphone element arranged to generate a first audio signal, wherein the first wireless microphone is arranged to generate a first output signal that comprises the first audio signal and information identifying the first wireless microphone;

a second wireless microphone with a second microphone element arranged to generate a second audio signal, wherein the second wireless microphone is arranged to generate a second output signal that comprises the second audio signal and information identifying the second wireless microphone; and a monitoring device with a display, wherein the monitoring device is arranged to receive the first and second output signals and to use the display to generate a visualisation of at least one aspect of the first and second audio signals, and to associate each visualisation with a representation of the information identifying the corresponding first or second wireless microphone;

wherein the visualisation of at least one aspect of the first and second output signals is a visualisation of a combined signal comprising the first and second audio signals and the system is further arranged to determine one of the first and second audio signals to be a primary contributor to the combined signal, and wherein the representation of the information identifying the corresponding first or second wireless microphone is a representation of the information identifying the wireless microphone that is an origin of the audio signal determined to currently be the primary contributor to the combined signal.

2. The wireless microphone system of claim 1, wherein the first wireless microphone comprises a first visual or audible feature representative of the information identifying the first wireless microphone and the second wireless microphone comprises a second visual or audible feature representative of the information identifying the second wireless microphone.

3. The wireless microphone system of claim 2, wherein the first visual or audible feature and the second visual or audible feature are chosen from the group consisting of: a first and a second colour, a first and a second symbol, a first and a second alphanumeric string of characters, and a first and a second playable sound file.

4. The wireless microphone system of claim 3, wherein the first and second visual or audible feature is a programmable feature chosen from the group consisting of: an LED that can be controlled to emit light with different colours, a display that can be programmed to display one or more different symbols or alphanumeric characters, a memory that can store one or more selectable or replaceable sound files.

5. The wireless microphone system of claim 1, wherein the at least one aspect is chosen from the group consisting of: a signal level, a waveform, a spectrum, and a position of the corresponding microphone.

6. The wireless microphone system of claim 1, further comprising a storage device arranged to receive and store the first output signal and the second output signal, or a signal derived from the first output signal and the second output signal.

7. The wireless microphone system of claim 6, wherein:

the visualisation of at least one aspect of the first and second output signals is a visualisation of a combined signal comprising the first and second audio signals during a period of time that is covered by the signals stored in the storage device;

the system is further arranged to determine one of the first and second audio signals to be a primary contributor to the combined signal, to store information identifying the audio signal determined to be the primary contributor together with the first output signal and the second output signal or the signal derived from the first output signal and the second output signal; and the representation of the information identifying the corresponding first or second wireless microphone is a representation of the information identifying the wireless microphone that is the origin of the audio signal determined to be the primary contributor to the combined signal during respective time periods.

8. The wireless microphone system of claim 1, further comprising a base station with a microphone array arranged to generate a plurality of local audio signals from which a spatially encoded sound-field signal may be produced, and wherein the system is further arranged to determine the position of the first and the second wireless microphone relative to the base station by comparing the first and second audio signals to the output from the microphone array.

9. The wireless microphone system of claim 8, wherein the system is further configured to store information related to the determined position of the first and the second wireless microphone together with the first output signal and the second output signal or a signal derived from the first output signal and the second output signal.

10. The wireless microphone system of claim 8, further comprising an editing device arranged to utilize the stored identification and the stored position of the first and second wireless microphone during post-processing or editing of the first audio signal, the second audio signal and the plurality of local audio signals, or signals derived therefrom.

11. A method in a wireless microphone system, comprising:

capturing a first audio signal using a first wireless microphone, and generating a first output signal that comprises the first audio signal and information identifying the first wireless microphone;

capturing a second audio signal using a first wireless microphone, and generating a first output signal that comprises the first audio signal and information identifying the second wireless microphone;

receiving the first and second output signals at a monitoring device and generating and displaying a visualization of at least one aspect of the first and second audio signals; and associating each visualisation with a representation of the information identifying the corresponding first or second wireless microphone;

further comprising:

generating a combined signal from the first and the second audio signals; and determining one of the first and the second audio signal to be a primary contributor to the combined signal;

wherein the visualization of at least one aspect of the first and second audio signals is a visualisation of the combined signal; and wherein the visualisation of the combined signal is associated with a representation of the information identifying the wireless microphone that is the origin of the audio signal determined to currently be the primary contributor to the combined signal.

12. The method of claim 11, further comprising:

providing the first wireless microphone with a visual or audible feature representative of the information identifying the first wireless microphone and the second wireless microphone with a visual or audible feature representative of the information identifying the first wireless microphone.

13. The method of claim 12, wherein the first visual or audible feature and the second visual or audible feature are chosen from the group consisting of: a first and a second colour, a first and a second symbol, a first and a second alphanumeric string of characters, and a first and a second playable sound file.

14. The method of claim 11, further comprising:

storing the first output signal and the second output signal, or a signal derived from the first output signal and the second output signal, in a storage device.

15. The method of claim 11, further comprising:

capturing a plurality of audio signals using a microphone array;

using the first audio signal, the second audio signal, and the plurality of audio signals to determine the position of the first and the second wireless microphone relative to the position of the microphone array; and storing the first output signal, the second output signal, the plurality of audio signals, and the determined positions to a storage device.

16. The method of claim 15, further comprising:

editing at least one of the first audio signal, the second audio signal, the plurality of audio signals, and signals derived therefrom based on at least one of information identifying wireless microphones, determined positions of identified wireless microphones, and determined primary contributors to a combined signal.

17. A cloud-based service, comprising:

a first communication interface arranged to receive a first input signal comprising a first audio signal and information identifying a first microphone and a second input signal comprising a second audio signal and information identifying a second microphone;

a monitoring device arranged to receive the first and second audio signals from the first communication interface and to generate a visualisation of at least one aspect of at least one of the first and second audio signals, wherein the visualisation includes a representation of the information identifying the corresponding first or second microphone; and a second communication interface arranged to transmit the generated visualisation in a format that can be displayed on a remote device;

wherein the visualisation of at least one aspect of the first and second audio signals is a visualisation of a combined signal comprising the first and second audio signals and the cloud-based service is further arranged to determine one of the first and second audio signals to be a primary contributor to the combined signal, and wherein the representation of the information identifying the corresponding first or second microphone is a representation of the information identifying the microphone that is an origin of the audio signal determined to currently be the primary contributor to the combined signal.

* * * * *